(12) United States Patent
Hill et al.

(10) Patent No.: US 6,457,485 B2
(45) Date of Patent: Oct. 1, 2002

(54) ROTARY VALVE ASSEMBLY FOR PRESSURE SWING ABSORPTION SYSTEM

(75) Inventors: Theodore B. Hill, San Diego; Charles C. Hill, Del Mar; Adam C. Hansen, San Diego, all of CA (US)

(73) Assignee: SeQual Technologies, Inc., San Diego, CA (US)

( * ) Notice: Subject to any disclaimer, the term of this patent is extended or adjusted under 35 U.S.C. 154(b) by 0 days.

(21) Appl. No.: 09/925,146

(22) Filed: Aug. 8, 2001

Related U.S. Application Data (62) Division of application No. 09/371,464, filed on Aug. 10, 1999.

(51) Int. Cl.[7] ..................... F16K 11/085; B01D 53/047; B08B 9/027
(52) U.S. Cl. .............. 137/240; 95/96; 95/130; 95/138; 96/124; 96/130; 96/133; 137/625.17; 137/625.46
(58) Field of Search .............. 95/96, 98, 130, 95/138; 96/124, 130, 133, 144, 149; 137/240, 312, 596.17, 625.17, 625.42, 625.46, 625.66

(56) References Cited

U.S. PATENT DOCUMENTS

| | | | |
|---|---|---|---|
| 5,268,021 A | 12/1993 | Hill et al. ................ | 95/98 |
| 5,366,541 A | 11/1994 | Hill et al. ................ | 95/96 |
| RE35,099 E | 11/1995 | Hill ........................ | 95/98 |
| 5,807,423 A | 9/1998 | Lemcoff et al. ......... | 95/96 |
| 5,814,130 A | 9/1998 | Lemcoff et al. ......... | 95/96 |
| 5,814,131 A | 9/1998 | Lemcoff et al. ......... | 95/96 |

Primary Examiner—George L. Walton
(74) Attorney, Agent, or Firm—Procopio, Cory, Hargreaves & Savitch, LLP (57) ABSTRACT

The present invention relates to a rotary valve assembly for a pressure swing adsorption system. The rotary valve assembly includes a first valve member and a second valve member relatively rotatable about a common center of rotation to provide valving action for selectively transferring fluids therethrough. The second valve member has a first fluid section with at least one aperture adapted for transferring a first fluid of a first pressure and composition therethrough and a second fluid section with at least one aperture adapted for transferring a second fluid of a second pressure and composition therethrough. The first valve member has a first fluid section with at least one passage for transferring the first fluid in the valve assembly and a second fluid section with at least one passage for transferring the second fluid in the valve assembly. A vent is located between the first fluid sections and the second fluid sections of the valve assembly and is vented to a pressure lower than the pressures of the first and second fluids so as to vent leakage from either of the sections of the valve assembly. The rotary valve assembly further includes means for effecting relative rotation of the first valve member and second valve member.

27 Claims, 10 Drawing Sheets

ROTARY VALVE ASSEMBLY FOR PRESSURE SWING ABSORPTION SYSTEM

This application is a divisional of application Ser. No. 09/371,464, filed Aug. 10, 1999.

FIELD OF THE INVENTION

This invention relates in general to the separation of gases by pressure swing adsorption (PSA), and in particular to a rotary valve assembly for a PSA system.

BACKGROUND OF THE INVENTION

Cyclic adsorption processes are generally practiced in batteries of adsorption vessels comprised of two or more adsorbent-filled vessels arranged in parallel and operated out of phase such that at least one vessel is in the adsorption mode while at least one other vessel is in the adsorbent regeneration mode.

In each cycle of the process a series of sequential steps, including adsorption, equalization and regeneration, are carried out in each vessel. To enable the various streams to flow to and from the vessels, the feed, product, and exhaust lines have been provided with a rotary valve assembly that provides valving action to permit gas flow through these lines at the appropriate time in the adsorption cycle.

The rotary valve assembly also permits communication between the inlet ends of the vessels and the outlet ends of the vessels to permit flow between the vessels during pressure equalization steps. Pressure equalization is the passage of gas from a first vessel that has just completed its adsorption step to a vented or evacuated vessel which has just completed its adsorbent regeneration step.

Relevant background art for pressure swing adsorption systems can be found in the following U.S. patents, all of which are hereby incorporated by reference for all they disclose and describe: U.S. Pat. Nos. 5,814,131, 5,814,130, 5,807,423, 5,366,541, 5,268,021, and Re. 35,009.

U.S. Pat. Nos. 5,814,130, 5,814,131 and 5,807,423 disclose a rotary valve assembly for use with adsorption vessels that generally includes a valve port disk and rotary valve. The valve port disk and the rotary valve are described as being ground to have highly polished flat finishes to enable the faces of the disks to form a fluid-tight seal with each other. The rotary valve is rotated relative to the stationary valve port disk so that openings on the face of the rotary valve register with holes in the valve port disk, providing valving action to permit appropriate gas flow through the vessels for the adsorption, regeneration and equalization modes.

Between the rotary valve and the inside surface of a valve assembly cover are a number of annular channels formed by multiple annular seal rings disposed around the valve. A respective exhaust line, purge fluid supply line and product gas line communicate with these annular channels. The rotary valve includes bores extending from the openings on the flat engagement surface to the periphery of the valve for communicating the openings with the annular channels and fluid lines.

There are a number of drawbacks with this proposed design in these patents. First, the multiple annular seal rings are impractical. The seal rings would be expensive to make, difficult to install and service, difficult to make leak-free (even when new), and would be subject to wear and increased leakage over time. The leakage between these various fluid streams could have serious negative effects on the performance of the gas separation device, i.e., the product gas would become contaminated. The seal rings also would greatly increase the torque required to turn the valve and, hence, increase the size of the motor.

Second, the rotary valve assembly is not pressure balanced. At the operating pressures needed for the separation cycle, a very heavy pre-load would need to be placed on the valve parts to prevent their separation while operating.

Third, the co-location of the purified product gas and feed gas on the faces of the rotary valve and the valve port disk would inevitably lead to leakage of the feed gas into the product gas. Feed gas is at higher pressure than the product gas and, hence, has the multiple driving forces of differential pressure and a large concentration gradient leading to contamination of the high purity product with contaminates from the feed gas. Even though the leak rate can be made very low by producing a valve face interface with sufficient accuracy, i.e., flatness and finish, the leakage can not be eliminated altogether since the valve depends on a thin gas film being established between the flat engagement surfaces of the rotary valve and the valve port disk. In the case of nitrogen separation from air, if the desired product purity is in the range of tenths of percentage points oxygen to PPM (Parts Per Million) levels of oxygen, the rotary valve assembly described in these patents could not be used.

SUMMARY OF THE INVENTION

The present invention provides a rotary valve assembly for a pressure swing adsorption system having means for inhibiting leakage and contamination between fluid sections of the valve assembly. The rotary valve assembly includes a first valve member and a second valve member relatively rotatable about a common center of rotation to provide valving action for selectively transferring fluids therethrough. The second valve member has a first fluid section with at least one aperture adapted for transferring a first fluid of a first pressure and composition therethrough and a second fluid section with at least one aperture adapted for transferring a second fluid of a second pressure and composition therethrough. The first valve member has a first fluid section with at least one passage for transferring the first fluid in the valve assembly and a second fluid section with at least one passage for transferring the second fluid in the valve assembly. A vent is located between the first fluid sections and the second fluid sections of the valve assembly and is vented to a pressure lower than the pressures of the first and second fluids so as to vent leakage from either of the sections of the valve assembly. The rotary valve assembly further includes means for effecting relative rotation of the first valve member and second valve member.

In a preferred embodiment of the invention, the first valve member is a rotating rotary valve shoe and the second valve member is a stationary valve port plate. The at least one aperture and passage of the first fluid sections are disposed at a first radius and the at least one aperture and passage of the second fluid sections are disposed at a second radius. The vent is comprised of an annular vent groove disposed in an engagement surface of the rotary valve member at a radius between the first radius and the second radius. The annular vent groove is vented to approximately atmospheric pressure.

An alternative rotary valve assembly includes a first valve member and a second valve member relatively rotatable about a common center of rotation to provide valving action for selectively transferring fluids therethrough. In this embodiment, a number (N) of concentric fluid sections are adapted to transfer N fluids therethrough. A number of concentric annular grooves equal to N−1 are located respectively between the fluid sections and vented to a pressure lower than the pressures of the fluids in adjacent concentric sections so as to vent any leakage from adjacent sections. The rotary valve assembly further includes means for effecting relative rotation of the first valve member and the second valve member.

An alternative rotary valve assembly includes a first valve member and a second valve member relatively rotatable about a common center of rotation to provide valving action for selectively transferring fluids therethrough. The second valve member has a central product fluid aperture at the common center of rotation through which product fluid flows to exit the assembly. A set of equally spaced product fluid apertures are concentrically disposed at a predetermined radius from the common center of rotation and are interconnected to product ends of adsorption vessels. The first valve member includes a cavity, at least one product passage for selectively interconnecting at least two apertures of the set of product apertures with the central product aperture and the cavity, and at least one purge passage interconnected with the cavity for selectively interconnecting the cavity with at least two apertures of the set of product apertures. The rotary valve assembly further includes means for effecting relative rotation of the first valve member and second valve member, whereby registration of the product fluid apertures of the second valve member with the product passage of the first valve member allows product fluid to exit the assembly through the central product aperture and enter the cavity for supplying balancing pressure for the first valve member and second valve member and purge gas via the at least one purge passage for regenerating more than one adsorption vessel.

In a preferred embodiment of the invention described immediately above, the rotary valve shoe includes at least one flow control element to control the flow of purge gas from the cavity.

An alternative rotary valve assembly for a pressure swing adsorption system having more than one adsorption vessel includes a valve port plate and a rotary valve shoe having respective engaged surfaces generally defining a plane and are relatively rotatable about a common center of rotation to provide valving action for selectively transferring fluids therethrough. The valve port plate has more than one aperture interconnected with the more than one adsorption vessel. The rotary valve shoe has at least one passage adapted to register with two of the apertures for equalizing two of the adsorption vessels and is not coplanar with the engagement surfaces. The rotary valve assembly further includes means for effecting relative rotation of the valve port plate and the rotary valve shoe to enable the valving action.

BRIEF DESCRIPTION OF THE DRAWINGS

The drawings illustrate both the design and utility of a preferred embodiment of the present invention, wherein.

DESCRIPTION OF THE PREFERRED EMBODIMENT

With reference to FIGS. 1A–1E, a pressure swing adsorption (PSA) system 20 including a rotary valve assembly 22, constructed in accordance with a preferred embodiment of the invention, will now be described. The PSA system 20 is used to fractionate fluids.

As used herein the term "fluids" includes both gases and liquids. Although the present invention will be described in conjunction with the separation of nitrogen from air, it will be readily understood by those skilled in the art that the present invention applies to the fractionation of other fluids such as, but not by way of limitation, the separation of oxygen from air.

The adsorption system 20 includes multiple adsorption vessels 24, each containing a bed of adsorbent material which is selective for a particular molecular species of fluid or contaminant, and the rotary valve assembly 22. In the preferred embodiment of the system 20, twelve adsorption vessels 24 are included. However, it will be readily understood by those skilled in the art how other numbers of vessels 24 (two or more) may be used. The adsorption vessels 24 preferably used in the system 20 include straight elongated vessels, as shown. Alternatively, the vessels 24 may have a construction such as, but not by way of limitation, U-shaped or concentric. Each adsorption vessel 24 includes a product end 28 and a feed end 30. The feed ends 30 communicate with respective feed lines or tubes 32 through passages in a header 34. Springs 36 are disposed near the bottoms of the adsorption vessels 24 to hold the packed beds of adsorbent material firmly in place. The product ends 28 communicate with passages in a manifold 38 for communication with the rotary valve assembly 22.

Figure 2:
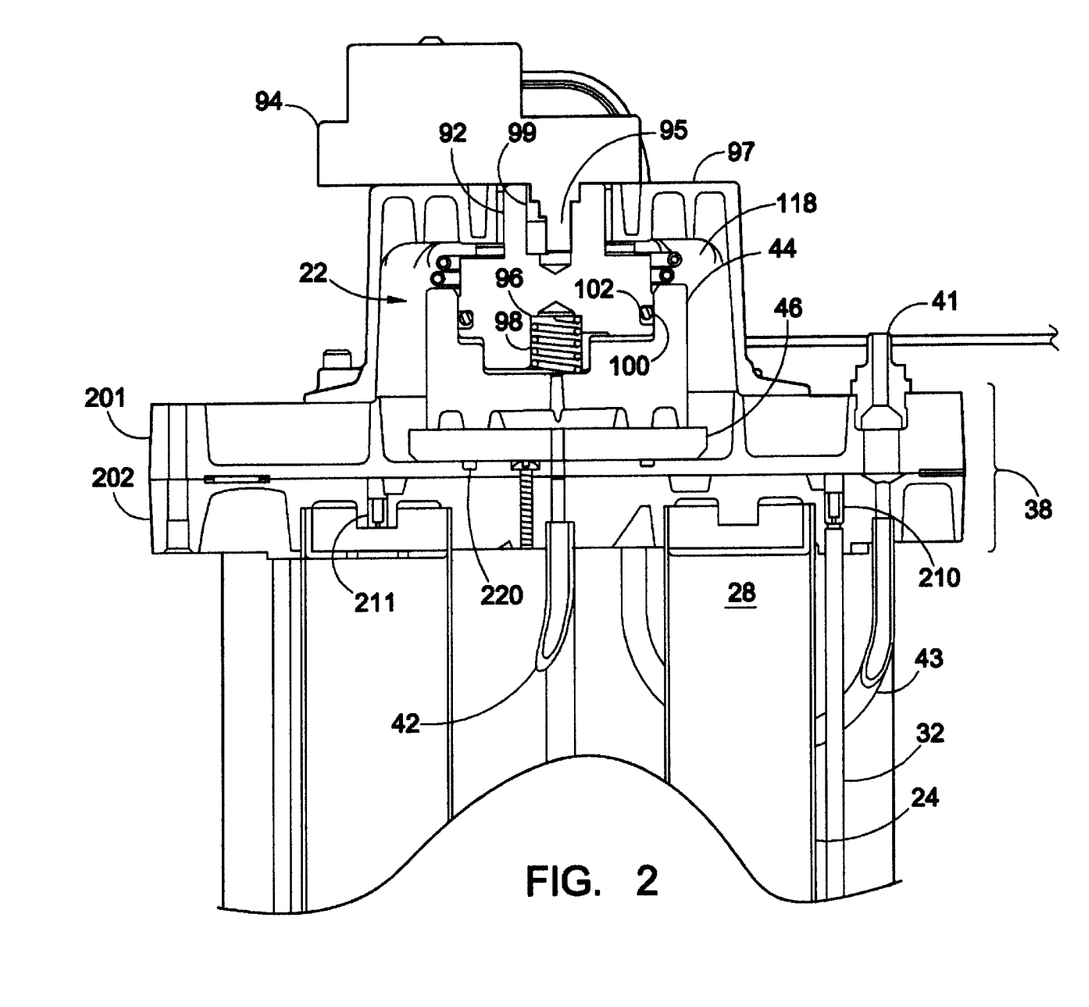
FIG. 2 is a partial, cross-sectional view of a top portion of the pressure swing adsorption system illustrated in FIGS. 1A–1D.
Figure 8:
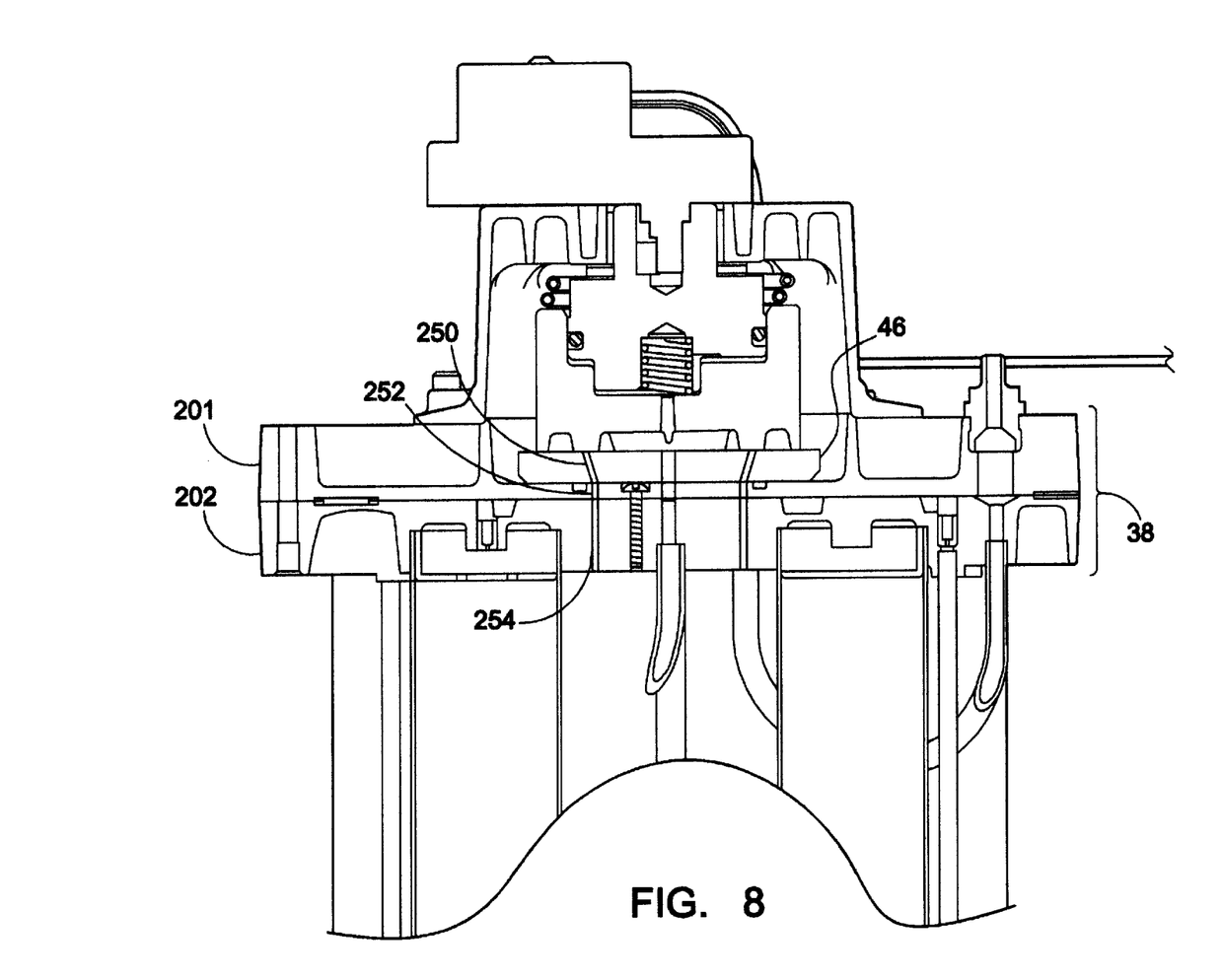
FIG. 8 is a partial, cross-sectional view of a top portion of a pressure swing adsorption system constructed in accordance with an alternative embodiment of the invention.
Figure 9:
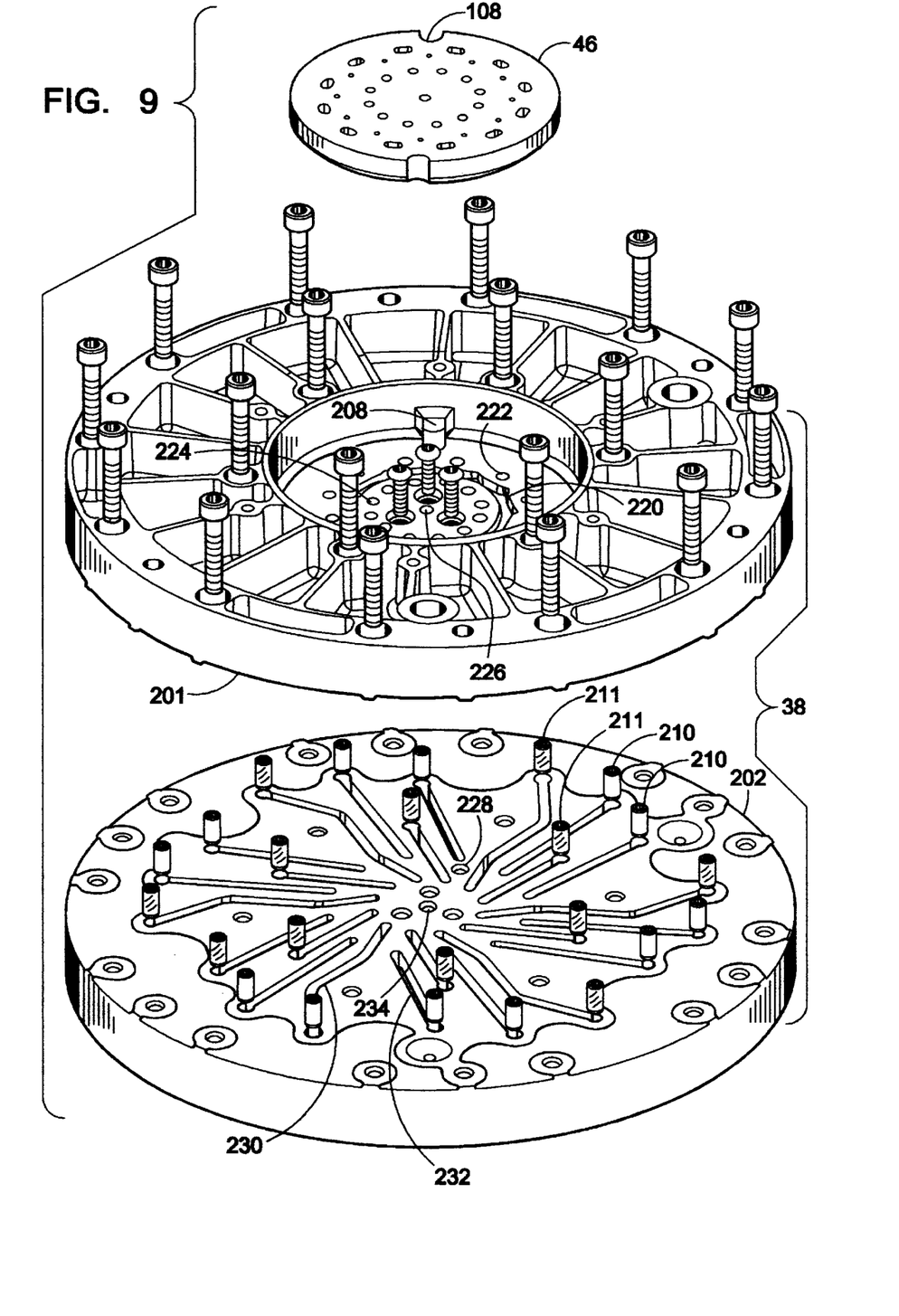
FIG. 9 is a perspective view of the valve port plate, top manifold member and bottom manifold member constructed in accordance with an embodiment of the invention.

With reference additionally to FIGS. 2, 8 and 9, the manifold 38 is constructed of a top member 201 and a bottom member 202. The manifold 38 serves to connect the rotary valve assembly 22 with the adsorption vessels 24 at both the feed ends 30 (via the feed tube 32) and the product ends 28. The two-piece construction allows for the creation of passages that connect apertures in either the top member 201 or bottom member 202. The preferred embodiment of the manifold 38 has provision for flow control elements to be inserted in these internal passages to control the rate of flow of various fluid streams within the system 20. The preferred embodiment includes both feed orifices 210 and product orifices 211 that control the flow of gas streams into and out of the adsorption vessels 24.

In the case that the density of internal passages is so great that it becomes difficult to route more passages in this manner, one or more external passages may be added. For example, in the preferred embodiment, this is done with a feed U-tube 43 that connects a feed fitting or air feed inlet 41 at a convenient location on the manifold 38 to the appropriate position on the manifold 38 near the valve assembly 22 and a product U-tube 42 that connects a product fitting or product outlet 40 at a convenient location on the manifold 38 to the appropriate position on the manifold 38 near the valve assembly 22.

An annular groove 220 (FIG. 9) in the top member 201 of the manifold 38 is used to introduce feed gas in the preferred embodiment. A single passage communicating to the annular groove 220 is then able to supply a fluid stream to a multiplicity of apertures 112 in a port plate 46 of the rotary valve assembly 22.

In the preferred embodiment, the two members 201, 202 making up the manifold 38 are fastened together with a multiplicity of stay bolts to resist the separation force created by the fluid pressure present in the internal passages. Additionally, a sealant is used to seal the various fluid passages so that there is no leakage from one passage to another or from a passage to an external surface. One skilled in the art will recognize that a number of methods exist to provide this sealing function such as using a gasket, O-rings, adhesive material or the like.

With reference to FIGS. 1–5, 8 and 9, to assist the reader in gaining a better understanding of the invention, the PSA system 20 will now be generally described in use. Air flows into the air feed inlet 41 and through the feed U-tube 43. Air flows through feed inlet aperture 228 and into air feed groove 220 in the manifold 38. From there, air flows to the rotary valve assembly 22 where it is distributed back through feed apertures 222 in the top member 201 of the manifold 38 to feed orifices 210 in the bottom member 202 via feed channels 232. The air then flows through multiple feed lines 32 to the header 34, where it is distributed to the adsorption vessels 24 at the feed ends 30.

The sieve beds (not shown) of the adsorption vessels 24 are a packed particulate adsorbent which preferentially adsorbs oxygen relative to nitrogen in the feed air so that nitrogen is produced as the non-adsorbed product gas. An adsorbent such as a carbon molecular sieve will provide this effect when the adsorption process is carried out on a kinetic basis.

The resulting product nitrogen gas flows towards the products ends 28 of the adsorption vessels 24, out product orifices 211 in the bottom member 202, through product channels 230, through product apertures 224 in the upper member 201, and to the rotary valve assembly 22, where it is distributed back through the manifold 38 via product aperture 226 of the upper member 201 and product aperture 234 of the lower member 202 to the product U-tube 42. The product U-tube 42 transfers the nitrogen product gas out to the nitrogen product outlet 40. As will be described in greater detail below, some of the product gas in the rotary valve assembly 22 may be used to purge or regenerate beds in the adsorption vessels 24.

With reference also to FIGS. 3A–3D and 4A–4B, a preferred embodiment of the rotary valve assembly 22 will now be described in more detail. The rotary valve assembly 22 includes a first valve member such as a rotary valve shoe or disk 44 and a second valve member such as a valve port plate or disk 46. Both the rotary valve shoe 44 and valve port plate 46 are preferably circular in construction. However, it will be readily understood by those skilled in the art that they may be shaped otherwise, for example, polygonal. The rotary valve shoe 44 and valve port plate 46 are preferably made from a durable material such as ceramic, which can be ground to a highly polished flat finish to enable the faces of the valve shoe 44 and port plate 46 to form a fluid-tight seal when pressed together.

With reference specifically to FIGS. 3A–3D, the rotary valve shoe 44 has a flat engagement surface 48 (FIG. 3D) and a cylindrical exterior surface 50. The valve shoe 44 has several symmetrical arcuate passages or channels cut into the engagement surface 48, all of which have as its center the geometric center of the circular engagement surface 48. The passages or channels include opposite feed channels 52, a first pair of equalization passages 54, a second pair of equalization passages 56, and opposite exhaust ports 58 (which open at the side wall 50). Although the passages or channels are generally described below as means for transferring fluid from one part of the engagement surface 48 to another, the passages or channels may also be configured to transfer fluid from the engagement surface 48, out of the rotary valve shoe 44. As will be better understood below, the passages or channels related to the feed fluid or the feed end 30 of the adsorption vessels 24 are part of a feed fluid section 59.

Figures 3A, 3B, 3C, 3D:
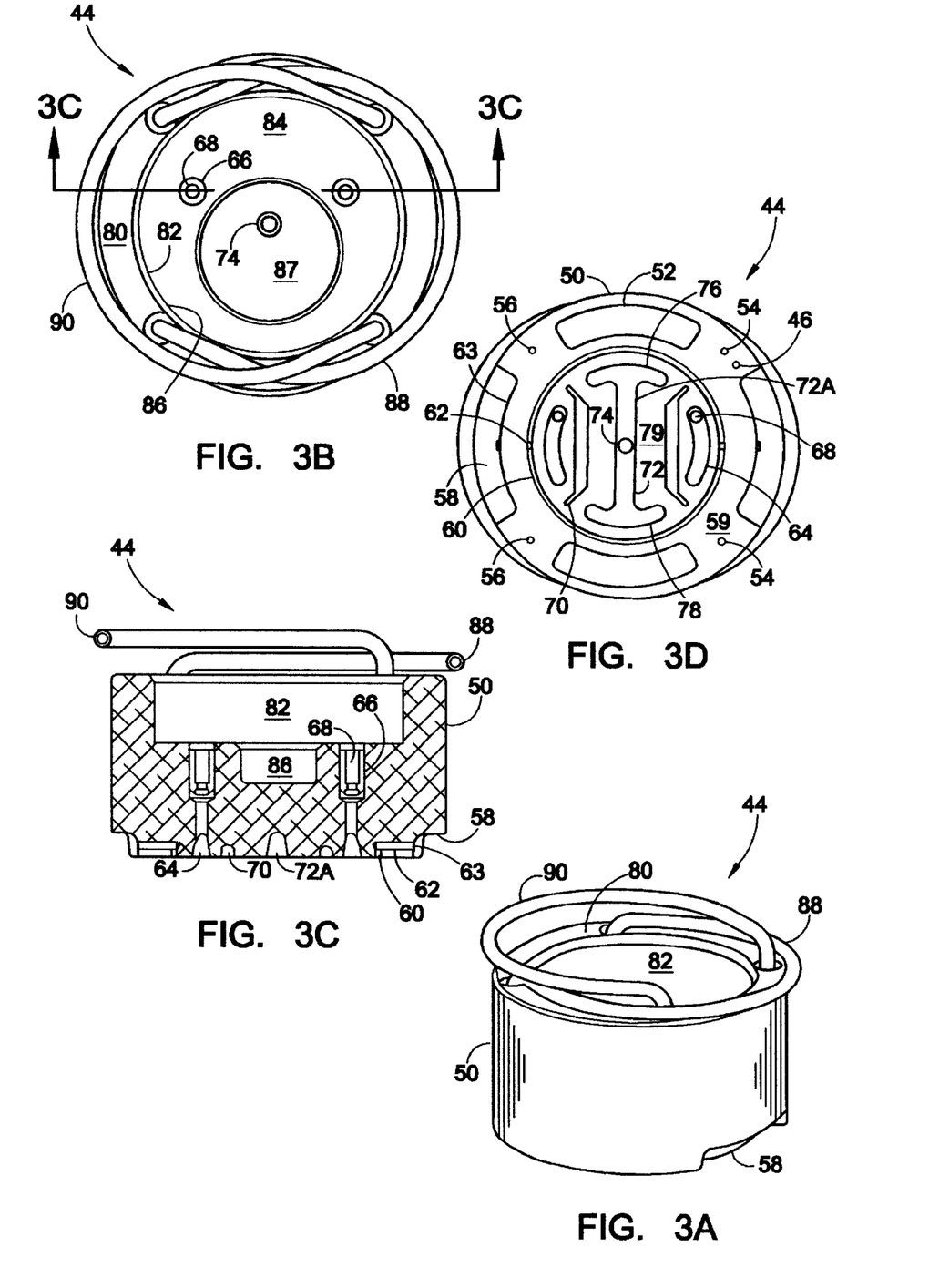
FIG. 3A is a top perspective view of a rotary valve shoe constructed in accordance with a preferred embodiment of the invention.
FIG. 3B is a top plan view of the rotary valve shoe illustrated in FIG. 3A.
FIG. 3C is a cross-sectional view of the rotary valve shoe taken along line 3C—3C of FIG. 3B.
FIG. 3D is a bottom plan view of the rotary valve shoe illustrated in FIG. 3A.

Proceeding radially inward from the aforementioned passages or grooves, the engagement surface 48 includes annular vent groove 60 and opposite passages 62 that extend from the vent groove 60 to the side wall 63 of the exhaust ports 58. Near the center of the rotary valve shoe 44 are arcuate purge channels 64, purge passages 66 in which flow control elements such as small orifices 68 are inserted, cross-port equalization channels 70, and product channels 72A and 72B which respectively extend radially from a central product passage 74 to symmetrical opposite arcuate product channels or pockets 76, 78. Other flow control elements may be used besides small orifices 68 such as, but not by way of limitation, sintered metal elements or capillary tubes. The above-described passages or channels located at radial positions inside the groove 60 that relate to the product fluid or product ends 28 of the adsorption vessels 24 are part of a product fluid section 79.

Although a pair of purge passages 66 and flow control elements 68 are described, it will be readily understood by those skilled in the art that one or more purge passages 66 and flow control elements 68 may be incorporated into the rotary valve shoe 44. If more than one flow control element 68 is used, it is desirable to match the flow characteristics of the flow control elements.

Figure 6A:
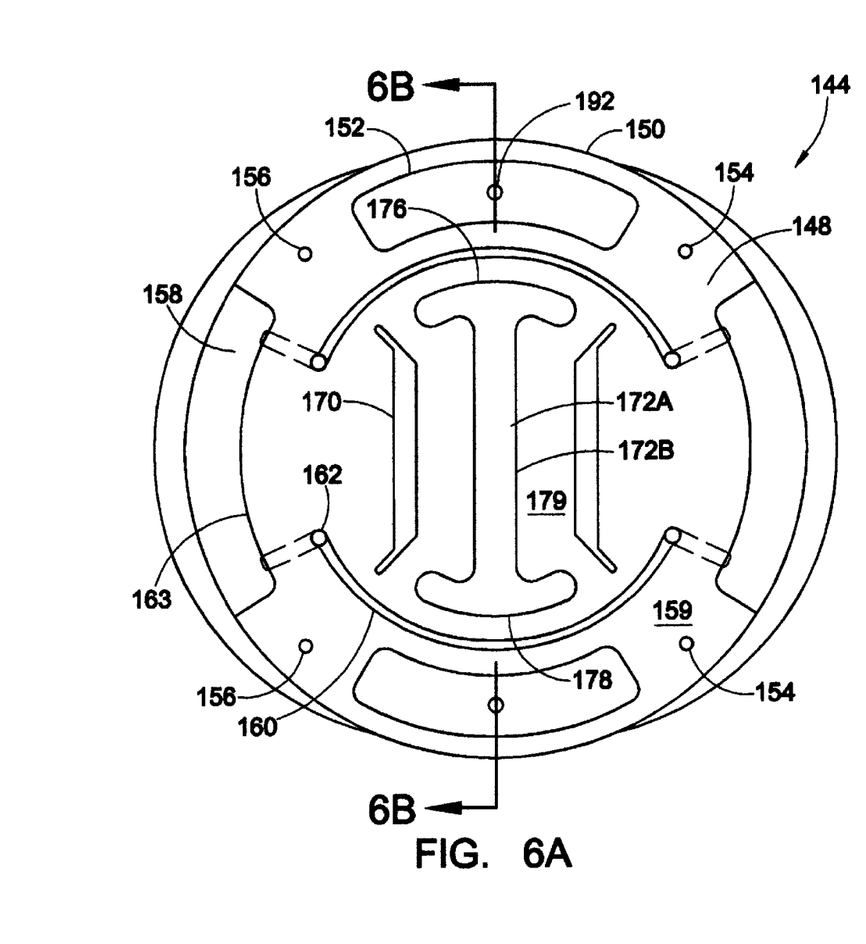
FIG. 6A is a bottom plan view of an alternative embodiment of a rotary valve shoe.
Figure 6B:
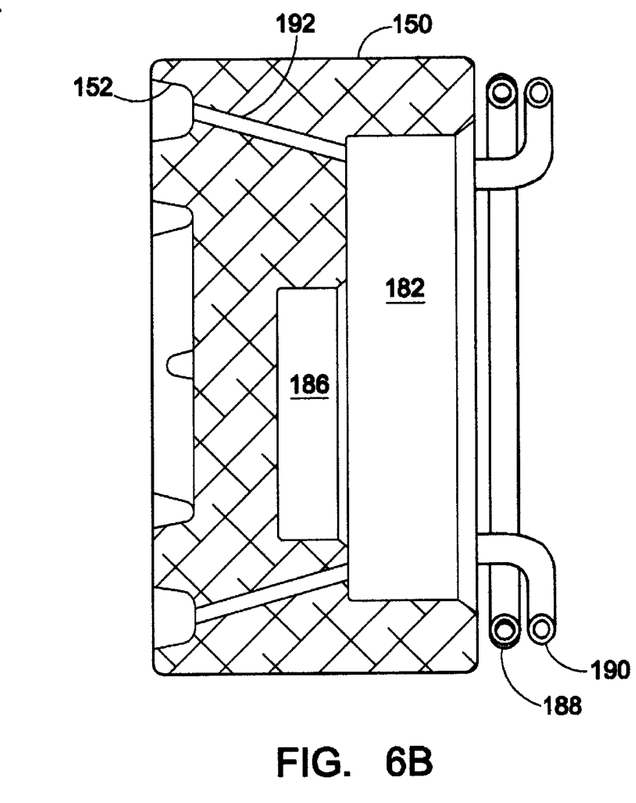
FIG. 6B is cross-sectional view of the rotary valve shoe illustrated in FIG. 6A taken along line 6B—6B.

With reference to FIGS. 6A and 6B, a rotary valve shoe 144 constructed in accordance with an alternative embodiment of the invention, which does not allow for product gas purge flow, is shown. Elements similar to those described above with respect to FIGS. 3A–3D are identified with numbers that include the same last two digits, but with a "1" prefix, i.e., 58 becomes 158, 63 becomes 163, etc. Because the embodiment of the rotary valve shoe 144 does not allow for product gas to be used as purge flow, the following elements described above with respect to FIGS. 3A–3D are not needed: pockets 64, passages 66, and flow control elements 68. This embodiment of the rotary valve shoe 144 is in fact the more common way to operate the nitrogen from air separation cycle when the adsorption vessels 24 are packed with a Carbon Molecular Sieve (CMS). The rotary valve shoe 144 includes opposite arcuate vent grooves 160 and multiple passages 162 that extend from the vent grooves 160 to the side wall 163 of the exhaust ports 158.

With reference back to FIGS. 3A–3E, an upper part of the rotary valve shoe 44 includes an upper annular surface 80 that surrounds a first annular recess 82 and a second surface 84 that surrounds an eccentric recess 86. An eccentric floor 87 defines a bottom part of the eccentric recess 86.

Equalization routing for the feed ends 30 of the adsorption vessels 24 is done in a plane out of a plane generally defined by the engagement surface 48 of the rotary valve shoe 44 because of the limited amount of room available for this purpose on the engagement surface 48. A first equalization tube 88 and a second equalization tube 90, each constructed of formed tubing, are bonded into passages 54 and 56 in the upper surface 80 of the rotary valve shoe 44 for interconnecting the first pair of equalization passages 54 and the second pair of equalization passages 56, respectively. The first equalization tube 88 and equalization passages 54 form a first passage adapted to communicate with the feed ends 30 of two adsorption vessels 24 for equalization purposes. Likewise, the second equalization tube 90 and equalization passages 56 form a second passage for this purpose.

Figures 7A, 7B, 7C, 7D, 7E:
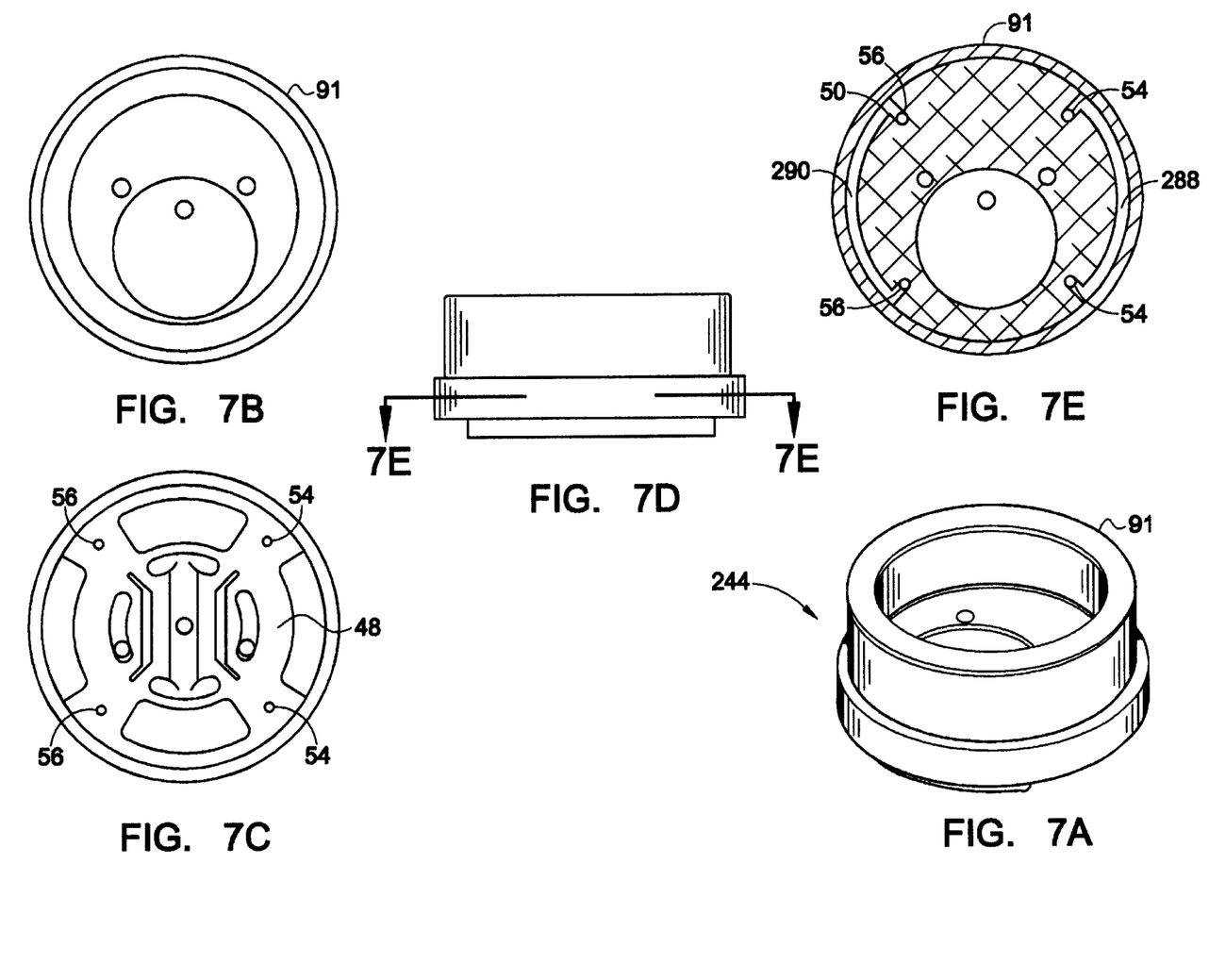
FIG. 7A is a top perspective view of a rotary valve shoe constructed in accordance with a further embodiment of the invention.
FIG. 7B is a top plan view of the rotary valve shoe illustrated in FIG. 7A.
FIG. 7C is a bottom plan view of the rotary valve shoe illustrated in FIG. 7A.
FIG. 7D is a side-elevational view of the rotary valve shoe illustrated in FIG. 7A.
FIG. 7E is a cross-sectional view of the rotary valve shoe taken along line 7E—7E of FIG. 7A.

With reference to FIGS. 7A–7E a rotary valve assembly 244 constructed in accordance with an alternative embodiment of the invention, which interconnects each set of equalization passages 54, 56 of the rotary valve shoe 44 in a different way, will now be described. As shown in FIGS. 7C and 7E, the equalization passages 54, 56 extend from the engagement surface 48 to the sidewall 50 of the rotary valve shoe 44. Each equalization passage 54, 56 is routed around the outer circumference or sidewall 50 of the rotary valve shoe 44, underneath a ring 91 that is shrunk or bonded onto the sidewall 50 of the rotary valve shoe 44, to interconnect each respective set of equalization passages 54, 56. It will be readily apparent to those skilled in the art that other ways exist to interconnect each set of equalization passages 54, 56 of the rotary valve shoe 44.

The purge passages 66 extend from the second surface 84 to the arcuate passages 64 of the rotary valve shoe 44. The central product passage 74 extends from the floor 87 of the eccentric recess 86 to the product channels 72A, 72B.

Figure 1A:
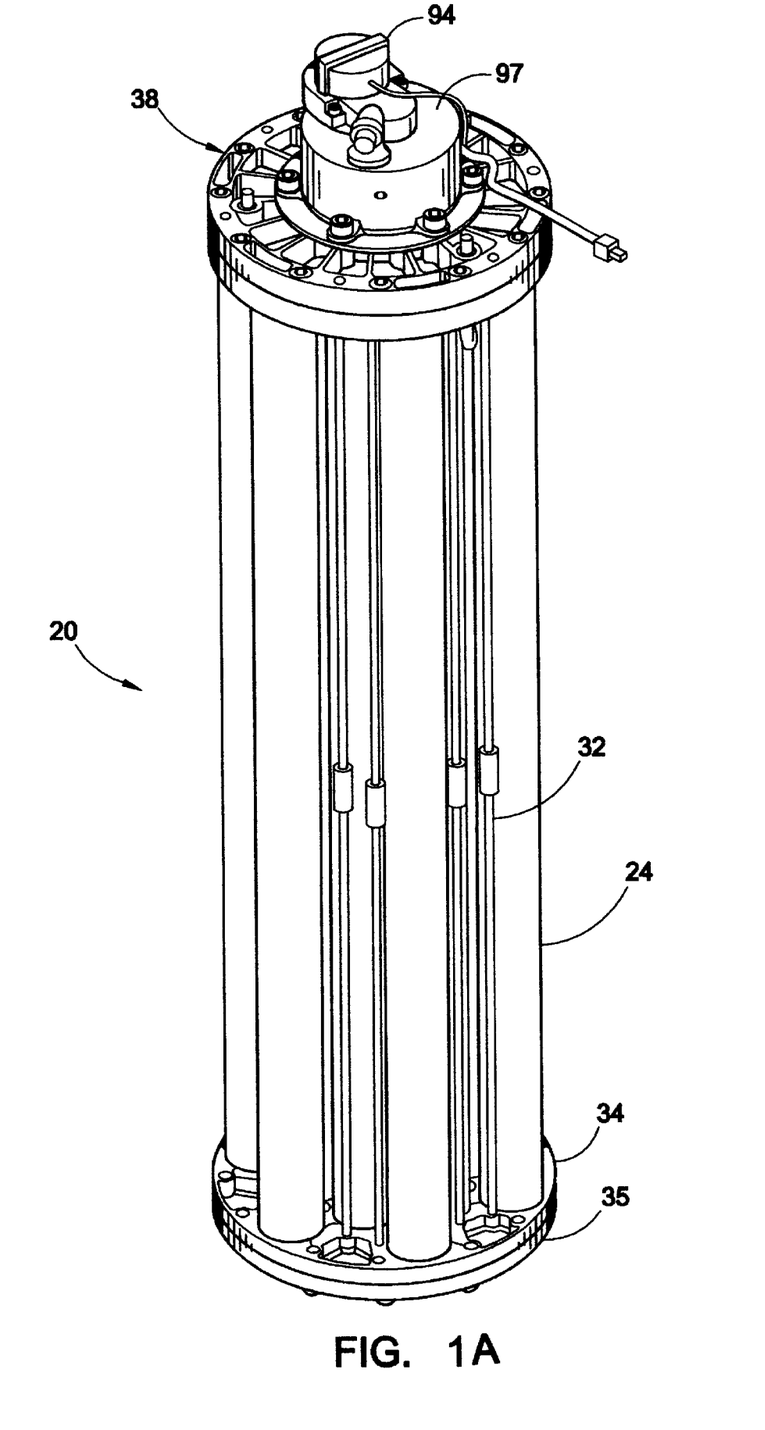
FIG. 1A is a perspective view of a pressure swing adsorption system constructed in accordance with a preferred embodiment of the invention.
Figures 1B, 1C, 1D, 1E:
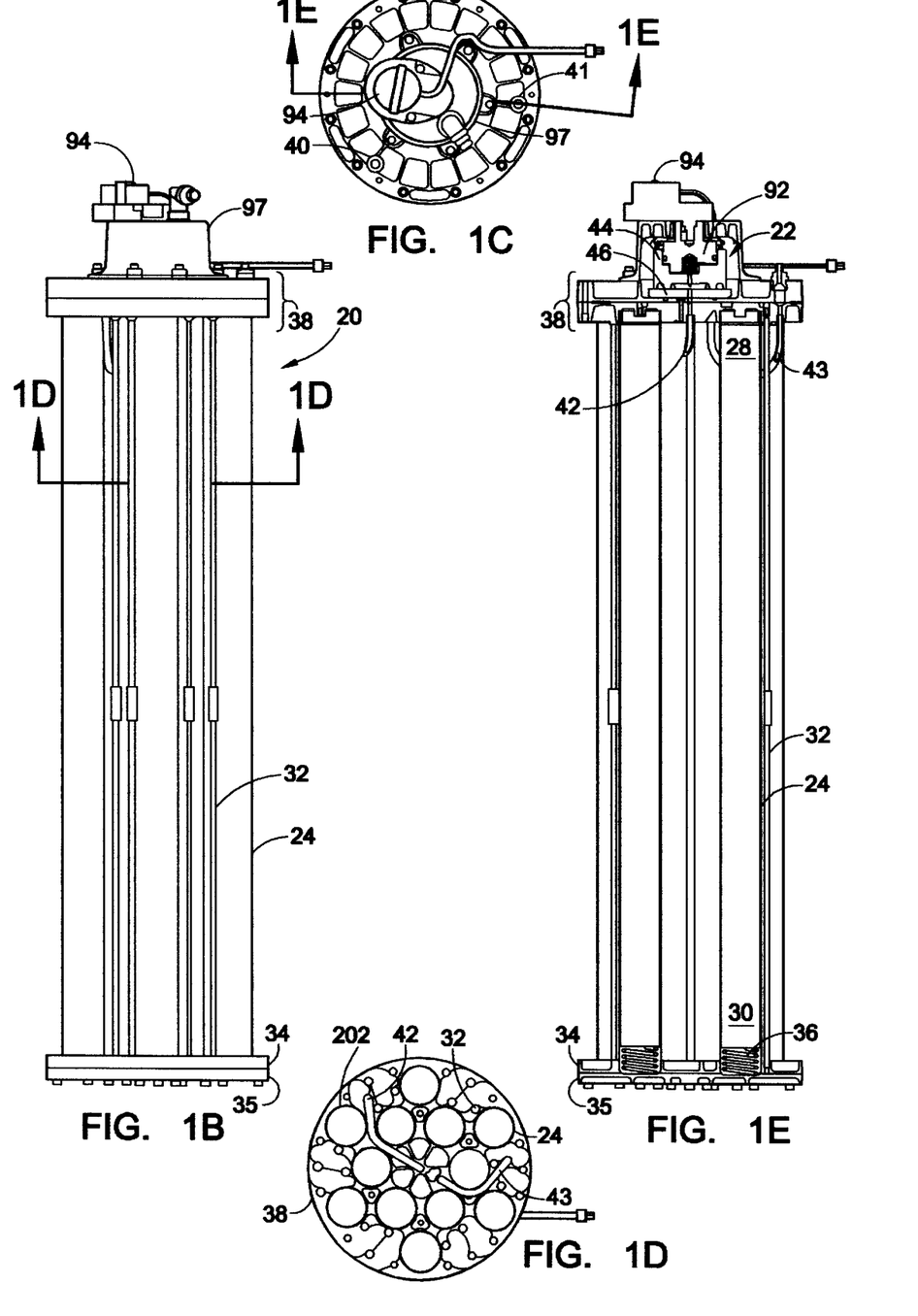
FIG. 1B is a side-elevational view of the pressure swing adsorption system of FIG. 1A.
FIG. 1C is a top plan view of the pressure swing adsorption system of FIG. 1A.
FIG. 1D is a cross-sectional view of the pressure swing adsorption system of FIG. 1A taken along line 1D—1D of FIG. 1B.
FIG. 1E is a cross-sectional view of the pressure swing adsorption system of FIG. 1A taken along line 1E—1E of FIG. 1C.
Figure 5:
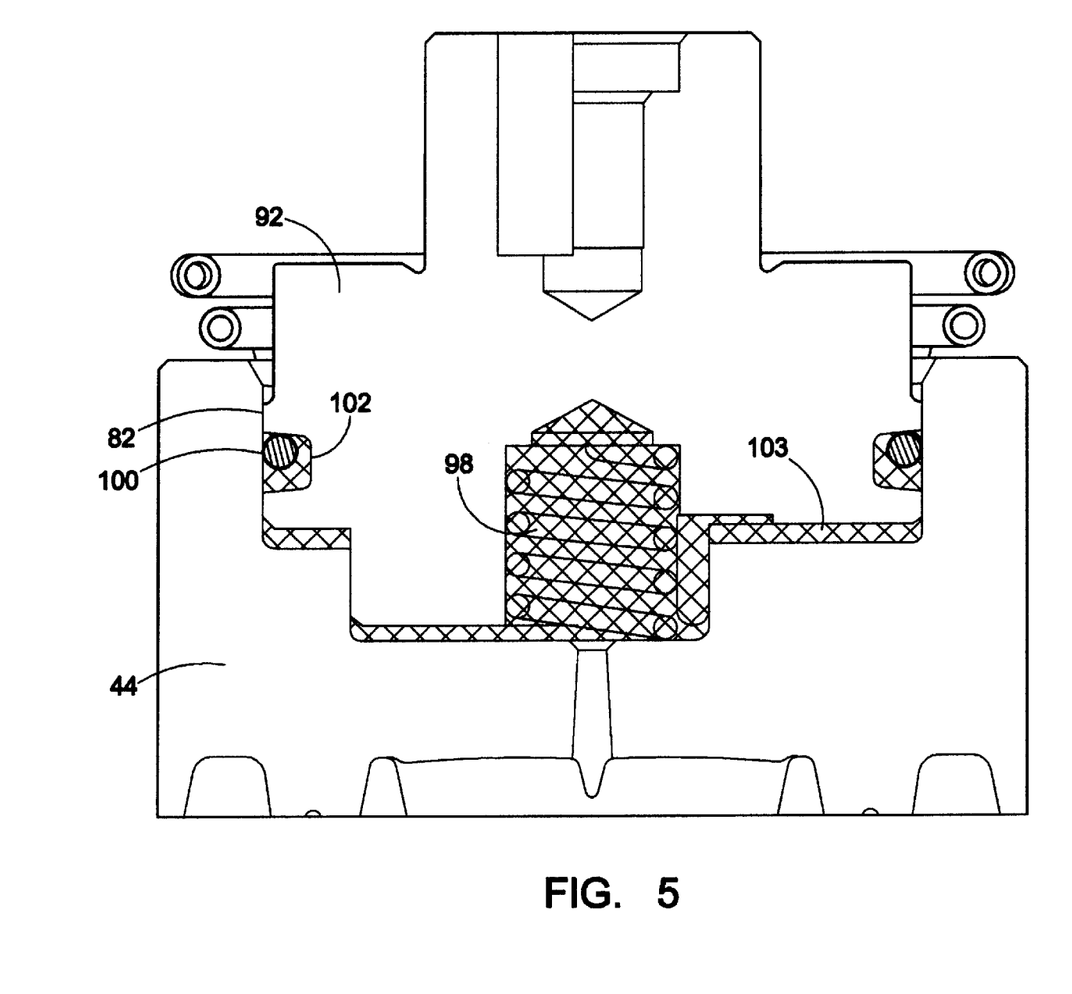
FIG. 5 is a cross-sectional view of an embodiment of the rotary valve shoe and a first drive shaft.

The first and second annular recesses 82, 86 are configured to receive a first drive shaft 92 as shown in FIGS. 1, 2 and 5. A drive motor 94 has a second drive shaft 95 which extends through a top wall of a valve assembly cover 97 and extends into a recess 99 in a top part of the first drive shaft 92. The motor 94 is connected to a source of electric power and its shaft 95 drives the shaft 92.

As the motor shaft 95 rotates, it causes the rotary valve shoe 44 to rotate, to cycle the adsorption vessels 24 through the various steps of the adsorption process. The motor 94 can impart continuous or stepwise rotation to the rotary valve shoe 44 around its center of rotation. Although the rotation of the valve 22 preferably includes the first valve member 44 rotating and the second valve member 46 remaining stationary, in an alternative embodiment of the invention, the opposite may be true or both valve members 44, 46 may rotate in the same or opposite directions. The valve members 44, 46 rotate at different speeds in the event they rotate in the same direction.

A cavity 96 in the first drive shaft 92 receives a spring 98 for applying a preload force against the rotary valve shoe 44. The spring 98 ensures that the rotary valve shoe 44 is in contact with the valve port plate 46 even at start-up, before a balance pressure (discussed below) is established. An O-ring 100 is located in a groove 102 of the drive shaft 92.

Figure 4A:
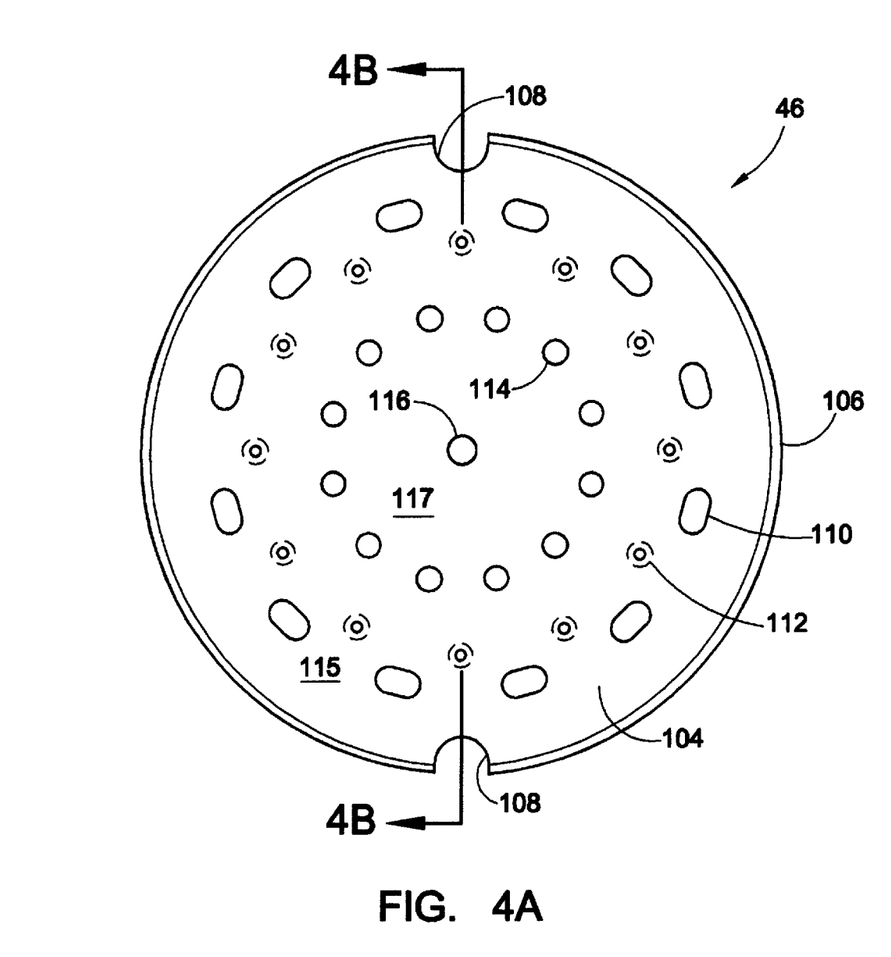
FIG. 4A is a top plan view of a valve port plate constructed in accordance with a preferred embodiment of the invention.
Figure 4B:
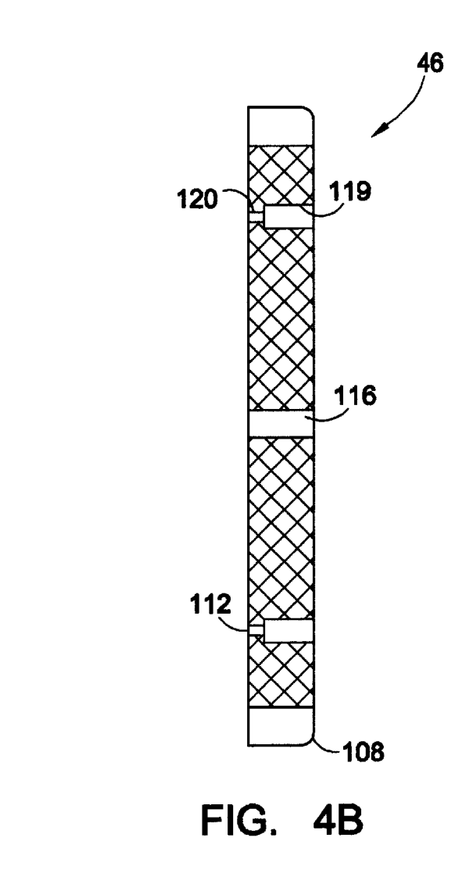
FIG. 4B is a cross-sectional view taken along lines 4B—4B of FIG. 4A.

With reference to FIGS. 4A and 4B, the valve port plate 46 will now be described in greater detail. The valve port plate 46 has a flat engagement surface 104 and a smooth cylindrical side wall 106 with opposite notches 108 therein.

The valve port plate 46 also includes multiple sets of symmetric concentrically disposed ports or openings. The openings preferably extend completely through the valve port plate 46 in a direction generally perpendicular to the engagement surface 104. Although some of the openings are described as having different configurations, it will be readily apparent to those skilled in the art that the openings may have alternative configurations such as, but not by way of limitation, round-shaped, square-shaped, sector-shaped and elongated holes. The openings may also extend through the port plate 46 at a variety of angles. Preferably, all of the openings of each set have the same configuration.

Each set of openings will now be described. A first set of twelve obround openings 110 are concentrically disposed at a first radius from the geometric center of the valve port plate 46 and interconnected with the feed ends 30 of the twelve adsorption vessels 24. Although sets of twelve openings are described herein, it will be readily apparent to those skilled in the art that other numbers of openings may be used. Further, the number of openings in each set need not match the number of absorption vessels 24, the number could be more or less.

A second set of twelve round feed openings 112 concentrically disposed at a second radius from the geometric center of the valve port plate 46 are interconnected with the feed air inlet for delivering feed fluid to the valve assembly 22. The feed openings 112 have a first bore 118 and a smaller diameter second bore 120.

A third set of twelve round openings 114 concentrically disposed at a third radius from the geometric center of the valve port plate 46 are interconnected with the product ends 28 of the twelve adsorption vessels 24.

A round central product opening 116 disposed at the geometric center of the valve port plate 46 and the center of rotation of the valve assembly 22 is interconnected with the product U-tube 42 and outlet 40 for withdrawing product fluid.

The openings 110, 112 are located in a feed fluid section 115 of the valve port plate 46. The feed fluid section 115 is the radial region of the valve port plate 46 outside of the vent groove 62 when the rotary valve shoe 44 is engaged in position with the valve port plate 46.

The openings 114 and central product opening 116 are located in a product fluid section 117 of the valve port plate 46. The product fluid section 117 is the radial region of the valve port plate 46 inside of the vent groove 60 when the rotary valve shoe 44 is engaged in position with the valve port plate 46.

In use, the flat engagement surface 48 of the rotary valve shoe 44 engages the flat engagement surface 104 of the valve port plate 46 so that the surfaces 48, 104 have the same geometric center. This center serves as the center of rotation of the rotary valve shoe 44. The notches 108 in the port plate 46 receive stop members 208 (FIG. 9) of the manifold 38 to prevent the port plate 46 from rotating or moving during rotation of the valve shoe 44.

Although not shown, conventional equipment may be used to supply feed fluid, monitor and automatically regulate the flow of product fluid from the system so that it can be fully automated to run continuously in an efficient manner.

With reference generally to FIGS. 1–4, the pressure swing adsorption system and particularly the rotary valve assembly 22 will now be described in use as it applies to the separation of nitrogen from air with the adsorption vessels 24 being packed with a particulate adsorbent, e.g., Carbon Molecular Sieve (CMS), which, based on a kinetic effect, preferentially adsorbs oxygen relative to nitrogen so that nitrogen is produced as the nonadsorbed product gas. During use of the pressure swing adsorption system 20, the rotary valve shoe 44 rotates in the valve assembly 22. Although the rotary valve shoe 44 preferably rotates with respect to the valve port plate 46 during use so that each cycle described below is sequentially and continuously established for each vessel 24, to help the reader gain a better understanding of the invention the following description describes the relationship between what occurs in the valve assembly 22 and the adsorption vessels 24 while the rotary valve shoe 44 is in a single position because at any given position all of the adsorption vessels are at some point in the PSA cycle.

It should be noted, with each revolution of the rotary valve shoe 44, the adsorption vessels 24 undergo two complete PSA cycles. For each cycle, the steps include: 1) adsorption, 2) equalization down, 3) regeneration, and 4) equalization up. As the rotary valve shoe 44 rotates over the valve port plate 46, each step described below is sequentially and continuously established for each vessel 24.

It will be readily apparent to those skilled in that art that the rotary valve assembly may be designed so that different number of cycles may be completed with each revolution of the rotary valve shoe 44. Further, although in the rotary valve assembly 22 illustrated the duration of the adsorption stages and purge stages is constructed to be the same, it will be readily apparent to those skilled in the art that the timing of these stages (as well as the equalization stage) may be varied by changing the configuration and/or location of the openings and/or channels in the rotary valve assembly 22.

Compressed air is supplied to the system 20 at the air feed inlet 41. The air may be pre-treated to remove particulates and liquid water. Feed air flows through the feed air U-tube 43 and into the manifold 38, where it is distributed via the feed air groove 220 to the valve assembly 22. The valve assembly 22 distributes the feed air to the multiple adsorption vessels 24.

Feed air enters the valve assembly 22 through the openings 112 (FIG. 4A) of the valve port plate 46. Air flows through the inner feed openings 112 and is blocked by the engagement surface 48 of the rotary valve shoe 44 except at opposite feed channels or pockets 52. Air flows into the feed channels 52, which communicate at least two of the openings 112 with at least two of the openings 110, and through the corresponding openings 110 of the valve port plate 46. The feed air then flows through feed apertures 222, feed orifices 210 and feed channels 232 in the manifold 38 and through the feed lines 32, into passages of the header 34. The air then flows from the feed ends 30 of the respective adsorption vessels 24 towards the product ends 28, and adsorption takes place in the adsorbent beds.

The nonadsorbed product gas flows out of the product ends 28 of the respective vessels 24, through product orifices 211, product channels 230 and product apertures 224 in the manifold 38 and through openings 114 in the valve port plate 46. It should be noted, the number of openings 114 through which product gas flows in the valve port plate 46 typically corresponds with the number of aforementioned openings 110 through which the initial air flowed through the valve port plate 46. The product gas flows into the arcuate channels 76, 78 of the rotary valve shoe 44 and is channeled towards the center of the rotary valve shoe 44 through the product channels 72A, 72B.

From the center of the rotary valve shoe 44, some of the product gas flows through central product opening 116, manifold 38, and out product U-tube 42 to the product outlet 40. The product gas not withdrawn flows through the passage 74 of the rotary valve shoe 44 and into a space 96 between the shoe 44 and shaft 92.

The pressure of the product gas in the space 96 produces a pressure-balancing effect on the rotary valve shoe 44. During use of the PSA system 20, various pressure forces in the system e.g., compressed feed air pressure, nitrogen product gas pressure, act to separate the shoe 44 from the port plate 46 at the engagement surface 48. The pressure of the product gas in the space 96 imparts a force on the rotary valve shoe 44 equal to or slightly greater than the pressure forces acting on the engagement surface 48 of the rotary valve shoe 44, causing the engagement surface 48 of the rotary valve shoe 44 to be pressed firmly against the engagement surface 104 of the valve port plate 46 so as to inhibit leakage at this interface. Balance is maintained over a broad range of operating pressures because pressure forces are all related and proportional to the inlet pressure. The O-ring 100 is pressure actuated for ensuring a good seal between the rotary valve shoe 44 and the first shaft 92.

The aforementioned compression spring 98 also biases the rotary valve shoe 44 against the valve port plate 46. The spring 98 is the only balancing force provided upon initial start-up of the PSA system, i.e., there is no balancing pressure in the space 96.

The balancing medium, i.e., product gas, in the space 96 is also a convenient, controllable source of purge gas for the separation cycle. Product gas in the space 96 flows out of the space 96 through the purge passages 66. The flow out of the space 96, i.e., the purge flow, is controlled by the small orifices 68 in the purge passages 66. Product gas flows through the purge passages 66 and into the opposite purge channels 64. In turn, product gas flows from the purge channels 64 through respective openings 114 in the valve port plate 46. Product gas then flows through appropriate through product apertures 224, product channels 230 and product orifices 211 in the manifold 38 and into the product ends 28 of the respective adsorption vessels 24. Product gas flows through the adsorbent material in the vessels 24, regenerating the adsorbent beds of the vessels 24 and sweeping out oxygen adsorbed therein.

As indicated above, in an alternative embodiment of the invention, as shown in FIGS. 6A and 6B, purging may not take place. Consequently, the purge channels 64 and purge passages 66, 68 may not exist.

Resulting exhaust gas flows out of the feed ends 30 of the vessels 24 and into lines 32. The exhaust gas flows out of the lines 32, through feed orifices 210, feed channels 232 and feed apertures 222 of the manifold 38, through outer feed and exhaust openings 110 of the valve port plate 46, and out of opposite exhaust ports 58. The exhaust gas exiting the rotary valve shoe 44 enters a chamber 118 between the rotary valve shoe 44 and the valve assembly cover 97. The exhaust gas exits the system 20 through an exhaust outlet and an optional silencer (not shown) that is in communication with the chamber 118. The exhaust gas may be vented to the atmosphere or withdrawn for further use. Also, a vacuum may be interconnected to the exhaust fitting to improve the withdrawal of the exhaust gas and assist in regeneration. Vacuum desorption may also be used if there is no purge option. The cover 97 may be sealed at its interface with the manifold 38 and the shaft 92 of the rotary valve assembly 22 may be sealed at its penetration through the cover 97 with an O-ring or similar device to facilitate applying a vacuum or collecting waste gas for further use. Separation of nitrogen from air may be accomplished without a purge or regeneration stage. However, purging or regenerating the adsorbent beds is done to improve the purity of the product gas where a high purity product level is important.

Equalization of the adsorption vessels 24 will now be discussed. It is well known to equalize the pressure between adsorption vessels transitioning between the adsorbing and desorbing cycles to enhance product concentration and high product flow rates. This is done by equalizing the pressure between adsorption vessels that have just completed the adsorption step and adsorption vessels that have just completed the regeneration step.

Cross-port equalization channels 70 are used to equalize the pressure between the product ends of two adsorption vessels 24 where adsorption has just occurred with the product ends of two respective adsorption vessels 24 where regeneration has just occurred. This is accomplished upon rotation of the rotary valve shoe 44 where one end of a cross-port equalization channel 70 communicates with an opening 114 corresponding to a vessel 24 that just completed the adsorption phase and the other end of the same cross-port equalization channel 70 communicates with a corresponding opening 114 corresponding to a vessel 24 that just completed the regeneration phase. Each cross-port equalization channel 70 serves as a bridge to communicate and, hence, equalize the pressures in the product ends 28 of the vessels 24.

In a similar fashion, the first equalization passages 54 and equalization tubes 90 and second equalization passages 56 and equalization tubes 88 serve to communicate and equalize the feed ends 30 of respective adsorption vessels 24 that have just completed the adsorption and regeneration steps. The first equalization passages 54 and second equalization passages 56 communicate with the feed ends 30 of the vessels 24 through the openings 110 of the valve port plate 46.

It should be noted, most of the communication that exists between the vessels 24 during the adsorption, regeneration and equalization steps results from the ports, passages and channels being generally parallel with the engagement surface 48 of the rotary valve shoe 44. An exception is the communication that exists between feed ends 30 of the adsorption vessels 24 for equalization purposes. This communication results from the first equalization passages 54 and tubes 90 and the second equalization passages 56 and tubes 88 which extend vertically through the rotary valve shoe 44, out of the upper annular surface 80 of the rotary valve shoe 44, and around a majority of the periphery of the upper annular surface 80. The equalization tubes 88, 90 are generally coplanar with each other and parallel, but not coplanar with the plane of the engagement surface 48 of the rotary valve shoe 44.

It will be readily apparent to one skilled in the art that the following exemplary equalization combinations are possible, depending on the application:

1) No equalization (either end);
2) Equalization (feed end only);
3) Equalization (product end only);
4) Equalization (both ends, i.e., feed-feed, product-product);
5) Equalization (feed end to product end);
6) Equalization (product end to feed end); and
7) Equalization (product end to both ends of regenerated bed).

The purpose of the annular vent groove 60 will now be described. As discussed above, feed gas and product gas flow through the feed fluid sections and product fluid sections of the valve port plate 46 and the rotary valve shoe 44. The vent groove 60 prevents leakage from one section from reaching the other. Of main concern is leakage from the feed fluid section into the product fluid section, i.e. leakage from the outer annular section into the inner annular section. Leakage from the feed section into the product section occurs because feed gas, i.e., air, is at higher pressure than the product gas, i.e., nitrogen, and, hence, has a driving force of differential pressure in combination with the driving force caused by a large concentration gradient. These driving forces may lead to contamination of the high purity nitrogen product gas with oxygen from the feed gas.

Even though the leak rate can be made very low by producing a valve face interface, i.e., the engagement surfaces 48, 104 of the rotary valve shoe 44 and valve port plate 46, with sufficient accuracy (flatness and finish) and applied contact force (through spring 98 and balance pressure in the space 96), the leakage cannot be eliminated altogether since the valve assembly 22 depends on a thin fluid film being established between engagement surfaces 48, 104 of the rotary valve shoe 44 and valve port plate 46. If the desired product purity is in the range of tenths of percentage points oxygen to PPM (parts per million) levels of oxygen, it is not practical to use many of the rotary valve constructions proposed in the prior art.

The annular vent groove 60 is ported to the relatively low pressure of the valve assembly chamber 118, where the exhaust gas normally flows, via the opposite passages 62. Because the valve assembly chamber is in communication with the atmosphere via the exhaust outlet, the pressure within the chamber 118 is at approximately atmospheric pressure. Leaking gases that would normally flow from the feed section to the product section at the valve interface stop at the annular vent groove 60 and are withdrawn through the passages 62 to the chamber 118, where they are then expelled to the atmosphere. Thus, leakage of feed gas into product gas is prevented.

In an alternative embodiment, the vent groove 60 may communicate with a vacuum, e.g., via chamber 118, to further reduce the pressure in the groove 60 and improve the ability of the groove 60 to prevent contamination. With reference to FIG. 8, in a further embodiment, the groove 60 may be vented by passages 250, 252, 254 extending through the port plate 46, upper manifold member 201 and lower manifold member 202, respectively, to the external atmosphere (or a vacuum connection).

Although two passages 62 are shown, it will be readily apparent to those skilled in the art that other numbers of passages, e.g., 1, 3, 4, etc., may be used. For example, with reference to FIGS. 6A and 6B, multiple passages 162 may be used to increase the flow area for leaking fluid to limit pressure in the groove 160 to near atmospheric pressure (or pressure maintained in chamber 118, e.g., with a vacuum). This limits the pressure drop through the passages and keeps the pressure in the vent groove 160 as low as possible.

Although the annular vent groove 60 has been described as being located on the engagement surface 48 of the rotary valve shoe 44, it may also be located on the engagement surface 104 of the valve port plate 46. In this instance, the opposite passages 62, i.e., vent ports, would preferably be made to pass through the port plate 46. Alternatively, both the rotary valve shoe 44 and valve port plate 46 may include opposing annular vent grooves on their respective engagement surfaces and venting could be done through either or both the rotary valve shoe 44 or the valve port plate 46.

In an alternative embodiment of the invention, where the number of fluid sections in the rotary valve is N and is greater than two, N−1 annular vent grooves may exist in the rotary valve assembly, one between each pair of fluid sections where leakage between fluid sections is a concern.

In a further embodiment of the invention, the vent groove 60 may comprise one or more vent grooves, not necessarily annular, located between different fluid sections and vented to a lower pressure than the pressure of the fluids in the adjacent sections. For example, with reference to FIGS. 6A and 6B, instead of an annular vent groove 60, two arcuate vent grooves 160 may be located between the product fluid section 179 and the feed fluid section 159.

Although some of the elements described above and below are referred to by order, i.e., "first," "second," etc., it should be noted that this is done to facilitate the reader's understanding of the invention and is not intended to limit the invention. Further, the foregoing description and drawings were given for illustrative purposes only, it being understood that the invention is not limited to the embodiments disclosed, but is intended to embrace any and all alternatives, equivalents, modifications and rearrangements of elements or steps falling within the scope of the invention as defined by the following claims.

We claim:

1. A rotary valve assembly for a pressure swing adsorption system, comprising:
a first valve member and a second valve member relatively rotatable about a common center of rotation to provide valving action for selectively transferring fluids therethrough, said second valve member having a first fluid section with at least one aperture adapted for transferring a first fluid of a first pressure and composition therethrough and a second fluid section with at least one aperture adapted for transferring a second fluid of a second pressure and composition therethrough, said first valve member having a first fluid section with at least one passage for transferring said first fluid and a second fluid section with at least one passage for transferring said second fluid, and a vent located between said first fluid sections and said second fluid sections of the valve assembly and vented to a pressure lower than the pressures of said first and second fluids so as to vent leakage from either of said sections of the valve assembly.

2. The rotary valve assembly of claim 1, wherein said at least one aperture and passage of said first fluid sections are disposed at a first radius and said at least one aperture and passage of said second fluid sections are disposed at a second radius, said vent comprising an annular vent groove disposed at a radius between said first radius and said second radius.

3. The rotary valve assembly of claim 2, wherein multiple vent passages are in communication with said annular vent groove for venting said groove.

4. The rotary valve assembly of claim 1, wherein said at least one aperture and passage of the first fluid sections are disposed at a first radius and said at least one aperture and passage of said second fluid sections are disposed at a second radius, said vent comprising at least one segmented vent groove disposed at a radius between said first radius and said second radius.

5. The rotary valve assembly of claim 1, where said first valve member is a rotatable rotary valve shoe and said second valve member is a stationary valve port plate.

6. The rotary valve assembly of claim 1, wherein said first fluid sections are product fluid sections adapted to transfer product fluids and said second fluid sections are feed fluid sections adapted to transfer feed fluids, said vent comprising an annular vent groove disposed between said product fluid sections and feed fluid sections.

7. The rotary valve assembly of claim 6, wherein said annular vent groove is located in the engagement surface of the rotary valve shoe.

8. The rotary valve assembly of claim 6, wherein said annular vent groove is vented to approximately atmospheric pressure.

9. The rotary valve assembly of claim 8, wherein the valve assembly includes a valve assembly cover surrounding the rotary valve shoe, a chamber located between the rotary valve shoe and valve assembly cover, the annular vent groove vented to the chamber.

10. The rotary valve assembly of claim 6, wherein the annular vent groove is located in the engagement surface of the valve port plate.

11. A rotary valve assembly for a pressure swing adsorption system, comprising:
a first valve member and a second valve member relatively rotatable about a common center of rotation to provide valving action for selectively transferring fluids therethrough, said second valve member having a first fluid section with at least one aperture adapted for transferring a first fluid of a first pressure and composition therethrough and a second fluid section with at least one aperture adapted for transferring a second fluid of a second pressure and composition therethrough, said first valve member having a first fluid section with at least one passage for transferring said first fluid and a second fluid section with at least one passage for transferring said second fluid, and means for inhibiting leakage between said fluid sections.

12. A rotary valve assembly for a pressure swing adsorption system, comprising:
a first valve member and a second valve member relatively rotatable about a common center of rotation to provide valving action for selectively transferring fluids therethrough, a number (N) of concentric fluid sections adapted to transfer N fluids therethrough, and a number of concentric annular grooves equal to N−1 located respectively between said fluid sections and vented to a pressure lower than the pressures of the fluids in adjacent concentric sections so as to vent any leakage from adjacent sections.

13. A rotary valve assembly for a pressure swing adsorption system having at least one adsorption vessel with a feed end and a product end, comprising:

a first valve member and a second valve member relatively rotatable about a common center of rotation to provide valving action for selectively transferring fluids therethrough, said second valve member having a central product fluid aperture at said common center of rotation through which product fluid flows to exit the assembly, a set of equally spaced product fluid apertures concentrically disposed at a predetermined radius from said common center of rotation and interconnected to said product ends of said adsorption vessels, said first valve member including a cavity, at least one product passage for selectively interconnecting at least one aperture of said set of product apertures with said central product aperture and said cavity, and at least one purge passage interconnected with said cavity for selectively interconnecting said cavity with at least one aperture of said set of product apertures, whereby registration of said product fluid apertures of said second valve member with said product passage of said first valve member allows product fluid to exit the assembly through the central product aperture and enter said cavity for supplying balancing pressure for the first valve member and second valve member and purge gas via said at least one purge passage for regenerating said at least one adsorption vessel.

14. The rotary valve assembly of claim 13, wherein said first valve member is a rotary valve shoe including at least one flow control element to control the flow of purge gas from said cavity and said second valve member is a valve port plate.

15. The rotary valve assembly of claim 14, wherein the flow control element is a member of the group consisting of orifices, capillary tubes and sintered metal elements.

16. A rotary valve assembly for a pressure swing adsorption system having at least one adsorption vessel, comprising:

a valve port plate and a rotary valve shoe having respective engaged surfaces generally defining a plane and relatively rotatable about a common center of rotation to provide valving action for selectively transferring fluids therethrough, said valve port plate having more than one aperture interconnected with said more than one adsorption vessel, and said rotary valve shoe having at least one passage adapted to register with two of said apertures and not coplanar with said engagement surfaces.

17. The rotary valve assembly of claim 16, wherein said at least one passage is adapted to register with two of said apertures for equalizing two of said adsorption vessels.

18. The rotary valve assembly of claim 16, wherein said at least one passage is located partially within said rotary valve shoe and partially outside said rotary valve shoe.

19. The rotary valve assembly of claim 18, wherein the portion of said at least one passage located partially outside said rotary valve shoe includes at least one piece of formed tubing bonded to the rotary valve shoe.

20. The rotary valve assembly of claim 16, wherein said at least one passage includes two passages, each passage located partially inside said rotary valve shoe and partially outside said rotary valve shoe, the portion of the passage located partially inside said rotary valve shoe including an internal passage extending generally perpendicular with respect to the plane generally formed by said engagement surfaces, and the portion of the passage located partially outside said rotary valve shoe including a piece of formed tubing bonded to said rotary valve shoe and extending generally parallel to said plane defined by said engagement surfaces.

21. The rotary valve assembly of claim 16, wherein at least one ring is disposed around the circumference of the rotary valve shoe and at least partially defines said at least one passage.

22. A fluid distribution manifold for a pressure swing adsorption system having at least one adsorption vessel with a feed end and a product end and a rotary valve assembly that provides valving action for selectively transferring fluids through the system, the fluid distribution manifold comprising:

a top member;

a bottom member secured to the top member; and said top member and bottom member including means for interconnecting the feed end and the product end of the at least one adsorption vessel with the rotary valve assembly for the control of the following fluid flows in the pressure swing adsorption system: feed, product, purge, waste and pressure equalization streams.

23. The fluid distribution manifold of claim 22, wherein the top member and bottom member are secured together and sealed at an interface with a member selected from the group consisting of a gasket, O-ring, sealant and adhesive.

24. The fluid distribution manifold of claim 22, further including respective means for transferring the product fluid from the system and feed fluid to the system, external to the top and bottom members.

25. The fluid distribution manifold of claim 22, further including a port plate located on the top member of the manifold, the port plate having a number of apertures therethrough, an annular groove located on the top member and coinciding with the apertures in the port plate, a passage interconnected with the groove for the introduction or withdrawal of a fluid stream present in the adsorption system.

26. The fluid distribution manifold of claim 25, wherein the groove is used to introduce the feed stream into the valve assembly.

27. The fluid distribution manifold of claim 22, wherein the interconnecting means includes flow control elements selected from the group consisting of orifices, capillaries or sintered metal.

\* \* \* \* \*